United States Patent
Bauer et al.

(10) Patent No.: US 10,227,511 B2
(45) Date of Patent: Mar. 12, 2019

(54) WATERBORNE POLYMERS FOR HEAT SEAL ADHESIVE

(71) Applicant: Lubrizol Advanced Materials, Inc., Cleveland, OH (US)

(72) Inventors: Leander H. Bauer, Seville, OH (US); Shui-Jen Raymond Hsu, Westlake, OH (US); Vic Stanislawczyk, Strongsville, OH (US); William Fish, North Ridgeville, OH (US); Stephan A. Horvath, North Royalton, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 39 days.

(21) Appl. No.: 15/115,816

(22) PCT Filed: Feb. 2, 2015

(86) PCT No.: PCT/US2015/014024
§ 371 (c)(1),
(2) Date: Aug. 1, 2016

(87) PCT Pub. No.: WO2015/119873
PCT Pub. Date: Aug. 13, 2015

(65) Prior Publication Data
US 2017/0009111 A1    Jan. 12, 2017

Related U.S. Application Data

(60) Provisional application No. 61/936,389, filed on Feb. 6, 2014.

(51) Int. Cl.
| | | |
|---|---|---|
| *C09J 133/08* | (2006.01) | |
| *C09J 133/10* | (2006.01) | |
| *C08F 220/18* | (2006.01) | |
| *C09J 5/06* | (2006.01) | |
| *C08L 23/08* | (2006.01) | |
| *C08L 31/04* | (2006.01) | |
| *C09J 7/35* | (2018.01) | |

(52) U.S. Cl.
CPC ........... *C09J 133/08* (2013.01); *C08F 220/18* (2013.01); *C08L 23/0853* (2013.01); *C08L 31/04* (2013.01); *C09J 5/06* (2013.01); *C09J 7/35* (2018.01); *C09J 133/10* (2013.01); *C08F 2220/1808* (2013.01); *C09J 2205/114* (2013.01); *C09J 2423/00* (2013.01); *C09J 2431/00* (2013.01); *C09J 2433/00* (2013.01)

(58) Field of Classification Search
CPC ...... C09J 133/08; C09J 133/10; C09J 133/12; C09J 2431/00–2431/008; C08F 220/18; C08F 2220/1808–2220/1883; C08L 23/0853; C08L 31/04
See application file for complete search history.

(56) References Cited

U.S. PATENT DOCUMENTS

| 5,306,743 | A | 4/1994 | Klesse | |
|---|---|---|---|---|
| 5,385,967 | A | 1/1995 | Bauer | |
| 5,763,100 | A * | 6/1998 | Quick | B65D 65/42 428/486 |
| 5,837,089 | A | 11/1998 | Magrum | |
| 6,368,707 | B1 | 4/2002 | Kamiya | |
| 7,189,461 | B2 | 3/2007 | Rabasco | |
| 8,383,723 | B2 | 2/2013 | Moncla | |
| 2002/0029713 | A1 * | 3/2002 | Morizumi | B41M 3/005 101/483 |
| 2013/0084403 | A1 * | 4/2013 | Tessari | B05D 5/067 427/486 |

FOREIGN PATENT DOCUMENTS

| WO | 2006/138311 A1 | 12/2006 |
|---|---|---|
| WO | 2011/017388 A2 | 2/2011 |
| WO | 2012/015717 A1 | 2/2012 |

* cited by examiner

*Primary Examiner* — Ling Siu Choi
*Assistant Examiner* — David L Miller
(74) *Attorney, Agent, or Firm* — Samuel Laferty; Teresan Gilbert

(57) ABSTRACT

This invention relates to a heat sealable adhesive composition for packaging for moderate to high moisture food products. The adhesive comprises latex in water with a minimum film formation temperature near or below 25° C. and an ethylene-vinyl acetate copolymer dispersion in water, blocking resistance up to 50° C., heat seal-ability under reasonable conditions of contact time, temperature and pressure, good adhesive properties, and approval for food contact.

13 Claims, No Drawings

WATERBORNE POLYMERS FOR HEAT SEAL ADHESIVE

CROSS REFERENCE TO RELATED APPLICATION

This application claims priority from PCT Application Serial No. PCT/US2015/014024 filed on Feb. 2, 2015, which claims the benefit of U.S. Provisional Application No. 61/936,389 filed on Feb. 6, 2014.

FIELD OF INVENTION

This application relates to waterborne polymer dispersions having utility as heat seal coatings having good moisture resistance for food packaging and related uses. A first polymer which has a low minimum film formation temperature is an acrylic emulsion polymerized copolymer and forms good coherent films with room temperature drying. A second polymer is an ethylene-vinyl acetate dispersion that provides blocking resistance of an adhesive coated lidding material at shipping and storage temperatures and possibly enhanced wetting at the heat seal temperature of 66-200° C.

BACKGROUND OF THE INVENTION

Heat seal adhesives for high moisture food and condiments have traditionally been partially crystalline polymers applied from solvent based solutions to the lidding material. The lidding material (often in the form of a film or foil) with applied adhesive is stored until needed to package food or condiments. It is desirable that the adhesive as applied to the lidding material does not adhere to any adjacent/contacting surfaces, e.g. other portions of lidding (adjacent lidding, etc.) while stored in warm or hot warehouses awaiting use (this is referred to as having blocking resistance).

Often, the food or condiments are added to a plastic container on a filling line, a lidding material is cut to a shape consistent with the top of the plastic container and positioned over the container, the lidding and container are brought together in the presence of a heated platen (the platen typically applied to an outside surface of the lidding and shaped to match the shape and dimensions of the top of the container). The heated platen melts and activates the adhesive (between the lidding and the container) to secure the lidding to the container and seal the package thereby preventing both ingression and egression of liquid and solid materials through the adhered surfaces.

A heat seal adhesive for high moisture foods needs to have low moisture sensitivity so it does not swell, whiten or otherwise produce a weakened bond between the container and lidding during storage of the food or condiment. The adhesive desirably has a food contact safe composition that can be approved by appropriate governmental agencies as the food or condiment in a sealed container can come into direct contact with the adhesive on the lidding material during shipping, sale, and post-sale.

When a consumer opens a heat sealed package of food or condiment, they generally prefer that the lidding with the adhesive attached thereto cleanly delaminate from the plastic container leaving the food or condiment in a clean adhesive free container.

U.S. Pat. No. 6,368,707 discloses a polymer for a heat-sensitive adhesive sheet comprising a substrate having formed thereon an adhesive layer comprising a polymer "A" having a glass transition temperature of −10° C. or below obtained by emulsion-polymerizing alkyl(meth)acrylates and copolymer "B" having a glass transition temperature of 20° C. or more and being a water-soluble or water-dispersible copolymer from unsaturated carboxylic acid with other radically polymerizable monomers, wherein part of the entire amount of carboxyl groups in the copolymer are neutralized with a base having a boiling point of 110° C. or below.

U.S. Pat. No. 5,385,967 discloses aqueous dispersions for heat-seal applications with a copolymer A having a glass transition of 50-150° C. and copolymer B with a glass transition of −50 to 50° C. and at least one of the two copolymers containing from 3 to 70% by wt. of an ethylenically unsaturated $C_3$-$C_5$ mono- or dicarboxylic acid or the anhydride thereof. The examples of the patent generally showed the high glass transition temperature polymer with high amounts of ethylenically unsaturated $C_3$-$C_5$ mono- or dicarboxylic acid or the anhydride thereof. Such high glass transition temperature polymers with high amounts of carboxylic resins are generally known as support resins and while providing good colloidal stability tend to impart unacceptable moisture sensitivity in applications where exposure to moisture occurs.

U.S. Pat. No. 5,306,743 discloses an aqueous synthetic resin dispersion comprising latex particles having an average diameter below 145 or 100 nm consisting of a core material with a glass transition temperature above 60° C. and a shell material with a glass transition temperature below 80° C., provided that the glass transition temperature of the shell is at least 20 K below that of the core (indicating a softer shell and harder core).

U.S. Pat. No. 5,837,089 to Ashland discloses a method of using a heat activatable adhesive for laminating vinyl sheet to wood. The organic solvent-free adhesive combines a reactive styrene-acrylic latex emulsion, an ethylene vinyl acetate copolymer emulsion, and a wax. After application to the vinyl substrate the adhesive is heat activated at temperatures as low as 160° F. (71° C.) and the laminate resists delamination at 190° F. (88° C.).

U.S. Pat. No. 7,700,703 to Rohm and Haas discloses a polymeric additive including one or more ethylenically unsaturated surfactant monomers. The additive is described as having a number average molecular weight less than 40,000 and having an improved balance of tack, adhesion, plasticity and peel strength and water whitening resistance as compared to other polymer additives.

U.S. Pat. No. 8,383,723 to Dow discloses method for forming a heat sealable coating on a substrate, wherein the substrate is formed from at least one oriented polymer. The method includes depositing an aqueous polymer dispersion on the substrate, wherein the aqueous polymer dispersion includes (A) at least one thermoplastic resin; (B) at least one dispersing agent; and (C) water; wherein the dispersion has a pH of less than 12, and drying the dispersion to form a first layer. Preferred polymers include copolymers of ethylene and another monomer, such as vinyl acetate, or propylene and another monomer.

WO 2011/017388 to Lubrizol Advanced Materials, Inc. discloses a heat sealable adhesive composition for plastic and metal containers for moderate to high moisture food products. The adhesive comprises latex in water with a minimum film formation temperature near or below 25° C., blocking resistance up to 50° C., heat seal-ability under reasonable conditions, good adhesive properties, and approval for food contact. The latex of WO 2011/017388 is similar to the acrylic latex of this invention.

U.S. Pat. No. 7,189,461 to Air Products discloses an invention directed to aqueous-based ethylene-vinyl acetate (EVA) polymer emulsions suited for use in heat seal applications. The EVA polymers of this invention are produced by a relatively low-pressure process, i.e., less than 2000 psig, preferably from about 1000 to about 2000 psig. The aqueous-based EVA based polymer emulsions contain crystalline segments resulting from ethylene linkages and are prepared by emulsion polymerizing ethylene and vinyl acetate, preferably with a carboxylic monomer, in the presence of a stabilizing system containing surfactant or a cellulosic protective colloid in combination with surfactant.

Heat seal adhesive is a broad category of materials. Some heat seal adhesives (called hot-melt adhesives) are applied as a hot fluid adhesive to one or more substrates to thereafter quickly form an adhesive bond between two or more substrates as the adhesive cools. This adhesive type does not need blocking resistance as the adhesive typically is heated immediately before application to two or more substrates and is not stored in contact with several substrates where it may prematurely cause an adhesive bond. A subset of adhesives for seals is those products where an adhesive is applied to one substrate (typically cardboard, paper, or plastic packaging) and the adhesive coated substrate is further processed or stored. Later during final assembly the adhesive coated substrate is heated above an activation temperature, at which temperature the heat seal adhesive then forms a bond between the original substrate and one or more additional substrates. In many cardboard, paper and plastic adhesive uses, the adhesive can have moisture sensitive components without having adhesion adversely affected (because they are used in relatively dry environments where the moisture effect on the adhesive is minimal).

SUMMARY OF THE INVENTION

This invention discloses an adhesive film for a heat seal adhesive desirably from a blend of two copolymers having an estimated interfacial adhesive activation temperature between 70 or 100 to 200° C. for forming an adhesive bond between a container (often plastic) and a lidding material (often plastic or aluminum). Said film comprising about 40 to about 90 or 95 parts by weight of at least one acrylic emulsion copolymer(s) with a minimum film formation temperature of less than 20 or 25° C. and from about 5 or 10 to about 60 parts by weight of an ethylene-vinyl acetate copolymer in dispersion form. The acrylic emulsion copolymer comprises from about 10 to about 50 wt. % repeat units from styrene and/or $C_1$-$C_4$ alkyl substituted styrene, from about 50 to about 90 wt. % of repeat units from polymerizing $C_1$-$C_{12}$ esters of acrylic (optionally methacrylic or ethacrylic) monomers, and up to about 10, 20, 30, or 40 wt. % of repeat units from other monomers. The ethylene-vinyl acetate copolymer comprises about 50 to 90 or 95 wt. % repeating units from ethylene, about 5 or 10 to 45 or 50 wt. % repeating units from vinyl acetate, and 0 or 0.1 to 5 wt. % repeating units from other monomers such as (meth)acrylic acid. The acrylic emulsion polymer and the ethylene-vinyl acetate copolymer would total 100 parts by weight in the adhesive film The preferred use of the adhesive is for heat sealing for moderate to high moisture food products such as condiments, yogurts etc. In one embodiment, the acrylic emulsion copolymer(s) would comprise a multi-stage emulsion copolymer with two compositionally different copolymers having two different calculated Tg values because of shifts in the monomer composition (controlled by feeding different monomer composition) between the first and second stage of the polymerization. In one embodiment for food contact, desirably the total combined amount of repeating units from styrene in said first and second acrylic copolymers is less than 50 parts by weight based upon 100 parts by weight of total acrylic copolymers.

Both acrylic copolymers and ethylene-vinyl acetate copolymers have been disclosed in the past as separate heat seal adhesives. The acrylic copolymers in the past have been compositionally selected so that they resist blocking (i.e. are non-adhering to new surfaces) at temperatures up to about 60 or 70° C., but become an adhesive when heated above 70° C., such as at an activation temperature of 100-200° C. The ethylene-vinyl acetate copolymer is in crystalline form and blocking at low temperatures and becomes adhesive when heated above 70° C. where the crystalline phase melts. The ethylene-vinyl acetate does not typically form a continuous film unless heated significantly above room temperature (e.g. >60° C.) or applied from a good organic solvent. Thus, it would be desirable to have a heat seal adhesive with minimum film forming temperature of 20-25° C. or less comprising acrylic copolymer(s) and the resistance to blocking of ethylene-vinyl acetate copolymers.

It was unexpected that blends of the acrylic copolymer and ethylene-vinyl acetate copolymer would demonstrate better blocking resistance than the acrylic copolymer alone and better adhesive strength to the lidding and plastic container than either the acrylic copolymer or the ethylene-vinyl acetate alone.

In a preferred embodiment, the acrylic emulsion copolymer(s) forms a film on the lidding material and individual particles of the ethylene-vinyl acetate copolymer are generally embedded in the film but extend up as protrusions beyond the film surface by 1, 2, or 3 to 8, 10, 12, 13, 18 or more micrometers. Thus, these less tacky ethylene-vinyl acetate protrusions act as a physical separation between the acrylic emulsion copolymer(s) film and any new surface at temperatures up to 70° C. These protrusions or bumps embedded in the acrylic emulsion copolymer(s) are believed to comprise disproportionately larger amounts of the higher temperature film forming ethylene-vinyl acetate copolymer than surrounding film areas. This feature of bumps of ethylene-vinyl acetate extending above the film surface has been shown to give optimal resistance to blocking (lack of adhesion) when lidding material coated on one side with the adhesive is coiled or stacked for storage before use.

DETAILED DESCRIPTION OF THE INVENTION

The two principal copolymers in the heat seal adhesive are an acrylic emulsion copolymer(s) and a dispersion of ethylene-vinyl acetate copolymer in a continuous media (such as aqueous media), in one embodiment said acrylic emulsion copolymer(s) having both a soft and a harder copolymer. We use the term acrylic emulsion copolymer(s) to mean either a single copolymer or a blend of two or more copolymer(s).

The term acrylic copolymer is used understanding that the copolymer has at least 50 wt. % repeating units from various alkyl acrylates, alkyl methacrylates, and alkyl ethacrylates. The acrylic copolymers can include other ethylenically unsaturated monomers such as $C_3$-$C_{10}$ mono or dicarboxylic acids, allyl methacrylate, vinyl aromatic, vinyl ester, nitrile, vinyl halide, etc.

In many cases, it is advantageous to utilize both an alkyl acrylate monomer and/or an alkyl methacrylate monomer in making the copolymers of this invention. These monomers can include alkyl acrylates, alkyl methacrylates, and alkyl ethacrylates. The alkyl group many contain from 1 to 15 carbon atoms and more desirably from 1 to 10 or 12 carbon atoms. Desirable acrylates include n-butyl acrylate, n-butyl methacrylate, ethylhexyl acrylate, ethyl acrylate, ethyl methacrylate, methyl acrylate, and methyl methacrylate. In one embodiment where food contact is anticipated, it is desirable that at least 40, 45, 50, or 55 wt. % of the polymer from the multi-step polymerization comprises the various alkyl (meth or eth) acrylates. The use of (meth) or (eth) or (meth or eth) indicates (throughout this specification) that the item in parentheses is optionally present. In a preferred embodiment, the acrylic copolymer(s) will include at least 10 wt. % and less than 50 wt. % repeating units from a styrene type monomer.

The ethylene vinyl acetate copolymer desirably has from about 50 to about 90 or 95 weight % repeat units of derived from radically polymerizing ethylene and from about 5 or 10 to about 45 weight % repeat units derived from polymerizing vinyl acetate. The ethylene vinyl acetate copolymer may have from about 0, 0.01 or 0.1 to about 5 or 10 wt. % of repeat units of other than ethylene and vinyl acetate such as (meth) acrylic acid, other unsaturated monomers having acid, amide, hydroxyl, or other functionality. Weight percent in this paragraph will be based on 100 parts by weight of said ethylene-vinyl acetate copolymer. In one embodiment, the amount of repeating units derived from ethylene will desirably be from about 65 to about 90 wt. % and more desirably from about 75 to about 85 wt. % and preferably from about 78 to about 82 wt. %. In one embodiment, the amount of vinyl acetate will be from about 10 to about 35 wt. %, more desirably from about 15 to about 25 wt. %, still more desirably from about 18 to about 22 wt. %. In one embodiment, the amount of repeat units from additional monomers besides ethylene and vinyl acetate will desirably be from about 0.1 to about 4 wt. %, more desirably from about 0.1 to about 3 wt. % and preferably from about 0.1 to about 2 wt. %. Desirably, these additional monomer repeat units will be selected from acrylic and methacrylic acid.

A preferred source of ethylene vinyl acetate dispersions is Chemipearl™ V200. Other sources of ethylene vinyl acetate suitable for this application are Chemipearl™ V-300 and V-100. Desirably, the ethylene-vinyl acetate copolymer is in the form of a dispersion in water. Desirably, the ethylene-vinyl acetate copolymer is substantially free of emulsifiers as these can go to the interfaces between the adhesive and the substrate and reduce adhesion or promote the solubility of water in the adhesive. The presence of emulsifiers in the ethylene-vinyl acetate can be roughly determined by measuring the surface tension of the water phase in the polymer dispersion. Desirably, the ethylene-vinyl acetate copolymer comprises less than 2, 1, 0.5 or 0.2 wt. % of surfactants of less than 500 g/mole molecule weight based on the weight of the ethylene-vinyl acetate dispersion. Desirably, the ethylene vinyl acetate copolymer dispersion has a volume average particle size from about 1 μm diameter to about 20 μm in diameter (as measure by dynamic light scattering methods such as a Malvern particle size analyzer or counting method such as a Coulter Counter), more desirably from about 2, 3, or 5 to about 13 or 15 μm and preferably from about 3 to about 10 μm.

In a preferred embodiment, the acrylic emulsion copolymer(s) would comprise a multi-stage emulsion copolymer with two compositionally different copolymers and two different Tg values and would be characterized as having a) from 50 to 75 parts by weight of i) a soft acrylic copolymer having a calculated Tg from about 0 to about −60° C. having from 0.2 to about 10 wt. % repeating units from a $C_3$-$C_{10}$ ethylenically unsaturated mono or dicarboxylic acid or its anhydride and optionally from about 0.15 or 0.3 to about 3 wt. % based on weight of soft acrylic copolymer of repeating units from a crosslinking monomer comprising two or more ethylenically unsaturated groups per molecule and ii) from about 25 to about 50 parts by weight of a hard acrylic copolymer (such as a copolymer with styrene repeating units) having a calculated Tg from about 50 to about 120° C. optionally including up to 10 wt. % repeating units from an ethylenically unsaturated $C_3$-$C_{10}$ mono or dicarboxylic acid or anhydride thereof and wherein said parts by weight are per 100 total parts by combined weight of said first acrylic copolymer and said second acrylic copolymer.

Desirably, the composition of the soft acrylic copolymer is adjusted so that the Tg (glass transition temperature) is from about −60 to about 0° C., more desirably from about −50 to about −10° C., and preferably from about −45 to about −30 or −15° C. Desirably, the composition of the hard acrylic copolymer is adjusted so that the Tg is from about 50 to about 120° C., more desirably from about 55 to about 110° C., and preferably from about 60 to about 100° C.

In preparing samples for heat sealing, it was determined that it is preferable that the soft acrylic copolymer be prepared in the first stage of the polymerization and the hard acrylic copolymer be prepared in the second stage of the polymerization, i.e., the second acrylic copolymer is polymerized in the presence of the soft acrylic copolymer. Additional copolymers may be made during the multi-stage polymerization. If they have the appropriate Tg value, the amount of such copolymers can be included in the soft or hard copolymer. If their Tg value falls outside the appropriate Tg range, they will be considered to be neither the soft or hard copolymer.

Examples of ethylenically unsaturated monomers that can be used in the acrylic copolymer polymerization process of the invention include mono vinyl aromatic monomers, alpha-beta ethylenically-unsaturated carboxylic acid ester monomers, unsaturated monomers with carboxylic acid groups, vinyl ester monomers, and various combinations of these. The acrylate monomers are preferably selected from the group consisting of esters of acrylic, methacrylic and ethacrylic acid (e.g., those with 4 to 30 carbon atoms) such as n-butyl (meth)acrylate, methyl(meth)acrylate, ethyl (meth)acrylate, 2-ethylhexyl-(meth)acrylate, cycloalkyl (meth)acrylates, such as isobornyl(meth)acrylate and cyclohexyl(meth)acrylate. Choices among the acrylate monomers are typically made to achieve the preferred glass transition temperatures (Tg) for the soft and hard copolymers or for the minimum film formation temperature of the acrylic emulsion copolymer(s). Methyl methacrylate is a known higher Tg acrylate. Acrylic and methacrylic acid have fairly high Tg values. The vinyl aromatic based monomers include styrene, i.e., styrene or $C_1$-$C_4$-alkyl substituted styrene, for instance alpha-methyl styrene or t-butylstyrene; and vinyltoluene. The diene monomers include dienes such as 1,3-butadiene or isoprene, and mixtures thereof. The ethylenically unsaturated monomers can include vinyl esters with 4 to 25 carbon atoms, such as vinyl acetate, vinyl alkanoate or their derivatives or mixtures thereof can be used in the monomer composition. Nitriles, such as acrylonitrile and/or (meth)acrylonitrile, or olefinically unsaturated halides, such as vinyl chloride, vinylidene chloride, and vinyl fluoride can also be used. Preferred vinyl ester monomers include vinyl esters of versatic acids such as the monomers commercialized by Momentive under the trade names VEOVA® 9, 10 and 11.

Unsaturated monomers with acid (e.g., mono or polycarboxylic acid) functionality, which include monomers of which the acid groups are latent as, for example, in maleic anhydride, are suitably selected from, but not limited to: acrylic acid, methacrylic acid, oligomerized acrylic acids such as beta-carboxyethyl acrylate or its higher analogues (commercially available from Rhodia as Sipomer™ B-CEA), itaconic acid, fumaric acid, maleic acid, citraconic acid, or the anhydrides thereof. Other acid type monomers include styrene p-sulfonic acid, ethylmethacrylate-2-sulfonic acid and 2-acrylamido-2-methylpropane sulfonic acid. An acid bearing monomer could be polymerized as the free acid or as a salt, e.g., the $NH_4$ or alkali metal salts. Monomers with carboxylic acid functionality are preferred over other (non-carboxylic) acid monomers, e.g., sulfonic acid.

Other monomers that may be present in amounts up to 5, 10, 15, or 20 weight percent based on the total monomers in the copolymer(s) of the multi-stage polymerization include acrylonitriles, vinyl chlorides, vinylidene chlorides, and amide functional monomers. Amide-functional co-monomers include, but are not limited to, acrylamide and methacrylamide.

Another group of monomers which are useful in preparing the copolymer(s) of the present invention are polar non-ionic monomers such as hydroxyalkyl (meth)acrylates, (meth)acrylamides and substituted (meth)acrylamides (e.g., N-methyl acrylamide), N-vinyl-2-pyrrolidone, N-vinyl caprolactam, 2-hydroxyethyl (meth)acrylate, 2-hydroxypropyl (meth)acrylate, 4-hydroxybutyl (meth)acrylate, (4-hydroxymethylcyclohexyl)-methyl (meth)acrylate, 1-(2-((2-hydroxy-3-(2-propenyloxy)propyl)amino)ethyl)-2-imidazolidinone, N-methylol (meth)acrylamide, Sipomer® WAM, WAM II (from Rhodia) and other urido-containing monomers, dimethylaminoethyl (meth)acrylate, and dimethylaminopropyl (meth)acrylamide. Mixtures of polar monomers also may be used. Those hydrophilic monomers should be used at appropriate levels, which do not impair the earlier water resistance.

Vinyl aromatic monomers (such as styrene and $C_1$-$C_4$-alkyl substituted styrene) can also be employed as the copolymerizable monomer. However, the total amount of vinyl aromatic monomers utilized in one embodiment for food contact for making the copolymer of this invention will typically not exceed about 50 weight percent and in another embodiment not to exceed 33 weight percent of the total weight of monomers employed in making the first and second copolymer (total polymers in multi-stage polymerization).

The polymerization techniques used to prepare such aqueous multi-stage emulsion-polymers are well known in the art such as, for example, as disclosed in U.S. Pat. Nos. 4,325,856; 4,654,397; and 4,814,373. A multi-stage emulsion polymerization process can result in the formation of at least two mutually incompatible polymer compositions, thereby resulting in the formation of at least two phases. The mutual incompatibility of two polymer compositions and the resultant multiphase structure of the polymer particles may be determined in various ways known in the art. The use of scanning electron microscopy using staining techniques to emphasize the difference between the phases. Such particles are composed of two or more phases of various geometries such as, for example, core/shell or core/sheath particles, core/shell particles with shell phases incompletely encapsulating the core, raspberry (three or more nodules per particle) morphology, core/shell particles with a multiplicity of cores, and interpenetrating network particles. It is believed that the morphology of the examples is raspberry rather than core shell.

Tg values used herein are those calculated by using the Fox equation; see T. G. Fox, Bull. Am. Physics Soc., Volume 1, Issue No. 3, page 123, (1956) based on the monomers fed to the polymerization in the separate stages. The formula for calculating the Tg of a copolymer of monomers M1 and M2 is $1/Tg(calc.)=w(M1)/Tg(M1)+w(M2)/Tg(M2)$, wherein Tg(calc.) is the glass transition temperature calculated for the copolymer, w(M1) is the weight fraction of monomer M1 in the copolymer, w(M2) is the weight fraction of monomer M2 in the copolymer, Tg(M1) is the glass transition temperature of the homopolymer of M1, and Tg(M2) is the glass transition temperature of the homopolymer of M2, with all temperatures being in ° K. Glass transition temperatures of homopolymers may be found, for example, in J. Brandrup and E. H. Immergut, ed., Polymer Handbook, Interscience Publishers.

It is desirable to include crosslinking monomers in at least the first soft acrylic copolymer and/or the acrylic emulsion copolymer(s). Crosslinking monomers are present in the structure of the soft acrylic copolymer in an amount from 0.1, 0.15 or 0.2 to 3, preferably 0.3 or 0.5 to 2 percent by weight based on the weight of the soft acrylic copolymer and/or the acrylic emulsion copolymer(s) A. The crosslinking is chosen just high enough so that the extensibility of the copolymer film is only slightly decreased in comparison with that of a corresponding non-crosslinked soft acrylic copolymer, but the resistance to blocking is increased slightly due to the molecular weight increase. Desirably, the crosslinking monomers (if present) in acrylic emulsion copolymer(s) is from 0.1, 0.15 or 0.2 to 3, preferably 0.3 or 0.5 to 2 percent by weight based on the weight of the acrylic emulsion copolymer(s). In a particular case, the degree of crosslinking is directed toward a particular use. For this purpose, a low content of crosslinking monomer is sufficient. It should be understood that to optimize resistance to blocking either crosslinking of the soft acrylic or raising the Tg of the hard acrylic copolymer can impart the desired result.

In one embodiment the crosslinking monomers have at least two ethylenically unsaturated, free radically polymerizable groups, suitable groups such as allyl, acryl, or methacryl groups, in the molecule. These are also known as internal or in-situ crosslinkers. Compounds having at least three such groups, which may be the same or different, but preferably are the same, are preferred. Examples of crosslinking monomers are diol and polyolesters of acrylic acid and/or of methacrylic acid reacted with di- or poly-functional alcohols, such as ethylene glycol diacrylate and dimethacrylate, butylene glycol diacrylate and di methacrylate, dipropylene glycol dimethacrylate, propylene glycol dimethacrylate, pentaerythritol tri- or tetra-acrylate and methacrylate, trimethylolpropane triacrylate and trimethacrylate, and allyl acrylate and methacrylate, divinylbenzene and trivinylbenzene, as well as triallyl cyanurate and triallyl isocyanurate. In many cases, graft crosslinking monomers which contain at least two ethylenically unsaturated, free radically polymerizable groups, among which is at least one allyl group, are particularly advantageous.

Conventional emulsifiers can be used to form the emulsion of monomers and to stabilize the growing latex particles of the acrylic emulsion copolymer(s). Typical anionic emulsifiers include alkali or ammonium alkyl sulfates, alkyl sulfonates, salts of fatty acids, esters of sulfosuccinic acid salts, alkyl diphenylether disulfonates, and the like, and mixtures thereof. Typical nonionic emulsifiers include polyethers, e.g., ethylene oxide and propylene oxide condensates, including straight and branched chain alkyl and alkylaryl polyethylene glycol and polypropylene glycol ethers and thioethers, alkyl phenoxypoly(ethyleneoxy) ethanols having alkyl groups containing from about 7 to about 18 carbon atoms and having from about 4 to about 100 ethyleneoxy units, and polyoxy-alkylene derivatives of hexitol, including sorbitans, sorbides, mannitans, and mannides; and the like, and mixtures thereof. Preferred surfactants include Dextrol™ OC-60, sodium lauryl sulfate, Dowfax™ 2A1, Aerosol™ OT, and dodecylbenzene sulfonate. Surfactants approved for food contact are preferred for heat seal applications involving food contact and are listed in 21 CFR § 177.1010 Subpart B. Co-surfactants typically are employed in the compositions of the present invention at levels of about 0 wt. % to about 3 wt. %.

The emulsion polymerization employed in synthesizing the copolymer(s) of this invention is carried out in a conventional manner using well-known additives and ingredients, such as emulsifiers, free radical polymerization initiators, and the like, and mixtures thereof. Either thermal or redox initiation processes may be used. The reaction temperature typically is maintained at a temperature lower than about 100° C. throughout the course of the reaction. In one embodiment, a reaction temperature between about 25° C. and 95° C. is used.

For the purpose of adjusting pH at the outset of the polymerization pH control agents and buffers typically are added. The initial reactor pH will normally be within the range of about 3 to about 10. However, other pH values may be obtained in particular applications using pH control agents and buffers well known to those skilled in the art. Non-limiting examples of suitable pH control agents include but are not limited to ammonium and alkali metal hydroxides (such as sodium hydroxide and potassium hydroxide), and mixtures thereof, and the like. Non-limiting examples of suitable buffers include ammonium carbonate, sodium carbonate, sodium bicarbonate, and mixtures thereof, and the like. pH may be adjusted if desired at the end of the polymerization process according to the desired application.

In preparing the hard acrylic copolymer component, any chain-transfer agent, or mixtures thereof, may be used to control molecular weight. Suitable chain transfer agents include, for example, $C_1$ to $C_{12}$ alkyl or functional alkyl mercaptans, alkyl or functional alkyl mercaptoalkanoates, or halogenated hydrocarbons, and the like, and mixtures thereof. Chain transfer agents, if used, are typically employed at levels of about 0.1 weight percent to about 2 weight percent, based on total monomer weight of monomers used in the hard second acrylic copolymer or in the acrylic emulsion copolymer(s).

The copolymers are typically prepared in the presence of water-soluble or organic solvent-soluble initiators (such as persulfates, peroxides, hydroperoxides, percarbonates, peracetates, perbenzoates, azo-functional compounds, and other free-radical generating species, and mixtures thereof), as is well known to those skilled in the art.

The latex formed by the multi-stage emulsion polymerization (if used) can optionally be diluted with additional water to any concentration (solids content) that is desired. Multi-stage polymerization is used to indicate that two or more stages can be present. A desirable feature from the multi-stage polymerization is that two or more different copolymer compositions are made such that a) a softer copolymer is present that provides wetting at the heat seal temperature and tack and b) a harder copolymer is present that helps prevent films of the latex from adhering to adjacent materials during storage before use (e.g. provide resistance to blocking) This latex can then be used in the preparation of water based adhesive heat seal coatings employing techniques that are well-known to those skilled in the art.

Desired pigments, plasticizers, coalescing solvents, fillers, wetting agents, stabilizers, defoamers, dryers, antibacterial agents, fungicides, insecticides, antifouling agents, and anticorrosive agents can be mixed directly into the latex.

Pigments may be added to adhesive formulations to impart color. Titanium dioxide is an example of a widely used pigment which imparts hiding and a white color. Mineral pigments (such as oxides of iron and chromium), organic pigments (such as phthalocyanine) and active anticorrosive pigments (such as zinc phosphate) are representative examples of other widely used pigments. Some representative examples of widely utilized fillers include chalks, clays, micas, barites, talcs, and silica. Some heat seal adhesives are clear and lack pigments.

A film forming, water based composition can be prepared utilizing a mixture of the ethylene-vinyl acetate copolymer dispersion and the acrylic emulsion copolymer(s) with suitable additives, including but not limited to coalescing solvent and plasticizer. A wide variety of food contact approved plasticizers can be used in the practice of this invention. To aid in resistance to blocking and to provide surface slip properties a micronized wax dispersion of straight chained hydrocarbon synthetic wax may be incorporated into the heat seal adhesive in amounts ranging from 1 to 5 wt. % based on the weight of the heat seal adhesive.

The water based heat sealable adhesive composition, as an aqueous dispersion or solution, can then be applied as a coating onto a suitable substrate such as plastic, paper, foil, or combinations thereof. As has been explained, the water based heat sealable adhesive compositions of this invention have particular value for application to lidding or other surfaces for packaging for high moisture food or condiment. High moisture food and/or high moisture condiments are particularly taught as the desired contents of the packaging because many of the conventional heat sealable adhesives for conventional paper, plastic and cardboard packaging are sufficient for packaging low moisture food items such as nuts, cereal, candy, sugar, flour, etc. or packaged store items such as electronics, molded articles, toys, etc.

The water based heat sealable adhesive is desirably applied to at least one surface of the packaging material (e.g. lidding) and allowed to dry to a film at a temperature below 60, 50, 40, 30 or 25° C. Desirable film thicknesses range from 2 to 50 $g/m^2$, more desirably from 3 to 30 $g/m^2$, and preferably from about 4 to 15 $g/m^2$ based on the dried weight of the adhesive per meter squared of surface. The heat seal adhesive layer can be any thickness, but for a precoated lidding material application, it is desirably from about 2 or 3 to 50 or 100 micrometers, more desirably from about 2 or 3 to about 10, 20, 30 or 40 micrometers. With these relatively thin coatings/films, it is easier to get the ethylene-vinyl acetate particles to protrude above the film surface and give blocking resistance during adhesive coated lidding storage. One desirable feature of the water based adhesive is that it is a film former at below 25° C. and desirably a film former at below 20° C. so that no heated drying is required to form an adhesive film on the lidding material.

This disclosure also relates to a method of forming a lidding material with a heat seal adhesive layer thereon comprising, the steps of a) providing a lidding material such as a plastic layer, metal foil, and or combination or laminate of metal and plastic in the form of a film; b) combining an acrylic emulsion copolymer having a minimum film formation temperature below 20 or 25° C. with an ethylene-vinyl acetate copolymer dispersion having a minimum film formation temperature of greater than 60° C. and wherein the ethylene-vinyl acetate a volume average particle size diameter of between about 3 and 15 micrometers thereby forming a physical blend; and c) coating said lidding material with said blend of acrylic emulsion copolymer and said ethylene-vinyl acetate copolymer and evaporating the continuous media of the blend at a temperature of less than 60° C. (more desirably less than 50, 40, 30, or 25° C.) thereby forming a film from 2 to 50 micrometers in thickness of said copolymer from the acrylic emulsion wherein said ethylene-vinyl acetate copolymer is embedded in said film and said ethylene-vinyl acetate copolymer forming protrusions above the film of acrylic copolymer of from about 2 to 13 micrometers in height.

In one embodiment, the above method of forming a heat seal lidding article is practiced using a heat seal adhesive as earlier described in this disclosure, such as where the weight ratio of acrylic emulsion copolymer to ethylene-vinyl acetate copolymer is from 40-95 wt. % acrylic emulsion copolymer and from 5 to 60 wt. % ethylene-vinyl acetate copolymer based on the combined weight of the acrylic copolymer and the ethylene-vinyl acetate copolymer.

It would be desirable to characterize the interfacial activation temperature that the adhesive experiences at the moment that the two surfaces are adhered together. We will call this the estimated interfacial activation temperature. It is believed to be between 100 and 200° C., more desirably between 120 and 175° C., and preferably between 135 and 150° C. We know the platen temperature useful with the adhesives in the examples below was 163° C. for 0.75 second of contact with an outer surface of the lidding material. Attempts to measure the adhesive temperature after contact with the heated platen resulted in the estimated temperatures.

This invention is illustrated by the following examples that are merely for the purpose of illustration and are not to be regarded as limiting the scope of the invention or the manner in which it can be practiced. Unless specifically indicated otherwise, parts and percentages are given by weight.

Abbreviations and Chemicals Used in Examples:
DM water: de-mineralized water
Dowfax™ 2A1: alkyldiphenyloxide disulfonate available from Dow
2-EHA: 2-ethylhexyl acrylate
ErA: Erythorbic acid 3.68 wt. % active
BHP: t-butyl hydroperoxides solution 17 wt. % active
Chemipearl™ A series is ethylene-alpha olefin copolymers from Mitsui
Chemipearl™ V series is ethylene-vinyl acetate copolymers from Mitsui
Chemipearl™ S series is ethylene-methacrylic acid copolymers from Mitsui
Michem™ Prime 499R is ethylene-acrylic acid copolymer from Michelman with solids contents from 32 to 35, Brookfield Viscosity (cps) 200-850 with spindle #3 and 60 RPM, and pH of 7.8-8.8.

Example 1, Two-Stage Acrylate Copolymerization (920-066)

Premix I was made by mixing 160 grams of water, 4.44 grams of Dowfax 2A1, 2.67 grams of sodium lauryl sulfate and 0.4 grams of sodium carbonate, 12 grams of methacrylic acid, 6 grams of allyl methacrylate, 16 grams of 60% n-methylol methacrylamide, 5 grams of methacrylonitrile, 62 grams of styrene, and 400 grams of 2-ethylhexyl acrylate. Premix II was made by mixing 40 grams of water, 1.78 grams of Dowfax 2A1, 4 grams of methacrylic acid, 236 grams of styrene, and 40 grams of 2-ethylhexyl acrylate. Initiator A was made by dissolving 1.2 grams of sodium persulfate in 18.4 grams of water. Initiator B was made by dissolving 1.6 grams of sodium persulfate in 80 grams of water. A 3-liter reaction vessel was charged as follows: 560 grams of water and 2.88 grams of Dowfax 2A1, which was then was heated to 84° C. under nitrogen. Initiator A was then added to the reaction vessel, followed by proportioning the Premix I to the reaction vessel. The reaction temperature was kept at 88° C. during polymerization. About 15 minutes after Premix I proportioning was finished, the proportion of Premix II was started. The total proportion time for Premix I and Premix II was about 3 hours. At 30 minutes after Premix I proportioning started, initiator B was proportioned into the reaction vessel over a period of about 3 hours and 30 minutes. After completion of initiator B feed, the temperature of the reaction vessel was maintained at 88° C. for 60 minutes. The reaction vessel then was cooled to 57° C., and then 4.71 grams of 17% t-butyl hydroperoxide solution was added to the reaction vessel. After about 5 minutes, 28.24 grams of 3.68% erythorbic acid solution was added to the reaction vessel. After 30 minutes, the addition of t-butyl hydroperoxide solution and erythorbic acid solution was repeated one more time at 40% levels. After 30 minutes, the above the reaction vessel was cooled to room temperature and filtered through 100-micron cloth. The polymer had a solids content of 46.4%, a viscosity of 80 cP, a particle size of 141 nm, a pH of 4.1, and a minimum film formation temperature below 20° C.

TABLE 1

Recipe for Example 1, Acrylate Two-stage Copolymerization

|  | Grams |
| --- | --- |
| Monomer Premix I | |
| DM water | 160. g |
| Dowfax 2A1 (45 wt. % active) | 4.44 |
| Sodium lauryl sulfate 30% active) | 2.67 |
| Sodium carbonate. | 0.4 |
| Methacrylic acid. | 12. |
| Allyl methacrylate | 6. |
| N-methylol methacrylamide 50% active | 16. |
| Methacrylonitrile | 40. |
| Styrene | 62. |
| 2-EHA | 400. |
| Monomer Premix II | |
| DM water | 64. |
| Dowfax 2A1 (45 wt. % active) | 1.78 |
| Methacrylic acid | 4. |
| Styrene | 236. |
| 2-EHA | 40. |
| Initiator A | |
| DM water | 18.4 |
| Sodium persulfate | 1.2 |
| Initiator B | |
| DM water | 80. |
| Sodium persulfate | 1.6 |
| Initial Reactor Charge | |
| DM water | 560. |
| Dowfax 2A1 (45 wt. % active) | 2.88 |

TABLE 1-continued

Recipe for Example 1, Acrylate Two-stage Copolymerization

| | Grams |
|---|---|
| Post Polymerization | |
| BHP 17 wt. % active | 4.71 |
| ErA 3.68 wt. % active | 28.24 |
| After 30 minutes | |
| BHP 17 wt. % active | 1.88 |
| ErA 3.68 wt. % active | 7.22 |

TABLE 2

Chemipearl ™ Properties

| Test | Unit | Method | A100 | A400 | V100* | V200** | V300 |
|---|---|---|---|---|---|---|---|
| Appear | — | Visual | | | translucent | | |
| Conc. | Wt. % | JIS K 6839 | 40 | 40 | 40 | 40 | 40 |
| pH | — | pH meter | 9 | 9 | 8 | 8 | 8 |
| Visc | mPa · s | BM viscometer | 5000 | 8000 | 7000 | 7000 | 7000 |
| Part. Size | μm | Coulter counter | 4 | 4 | 12 | 7 | 6 |
| Lowest T film form. | ° C. | MCI method | 85 | 73 | 75 | 85 | 75 |
| Density | kg/m$^3$ | JIS K-6760 | 890 | 885 | 950 | 940 | 840 |
| Tensile | MPa | JIS K-6760 | 14 | 20 | 4.5 | 6.5 | 3 |
| Elong. | % | JIS K-6760 | 800 | 950 | 950 | 600 | 300 |
| Vicat Soft. | ° C. | JIS K-6760 | 60 | 55 | <40 | 40 | <40 |

TABLE 3

Heat Seal Adhesive Composition and Properties

| Specimen | Acrylic (wt. %) | Chemi-pearl | Drying Temp F. (C.) | Film | Adhesion | Peel g/in | Blocking value |
|---|---|---|---|---|---|---|---|
| 1 | Example 1, 100 | 0 | 140 (60) | yes | yes | 656 | 2 |
| 2 | Example 1, 90 | 10 | 140 (60) | yes | yes | 779 | 4 |
| 3 | Example 1, 80 | 20 | 140 (60) | yes | yes | 976 | 4 |
| 4 | Example 1, 70 | 30 | 140 (60) | yes | yes | 1046 | n/a |
| 5 | Example 1, 50 | 50 | 140 (60) | yes | yes | 1175 | n/a |
| 6 | Example 1 25 | 75 | 140 (60) | yes | yes | 690 | n/a |
| 7 | 0 | 100 | 212 (100) | yes | yes | 476 | n/a |
| 8 | 0 | 100 | 167 (75) | no | no | — | n/a |
| 9 | 0 | 100 | 68 (20) | no | no | — | n/a |
| 10 | Example 1, 90 + 10 wt. % A400 | 0 | | yes | yes | 920 | 2 |
| 11 | Example 1, 90 + 10 wt. % S100 | 0 | | yes | yes | 880 | 3 |
| 12 | Example 1, 90 + 10 Michem ™ Prime 4990R | 0 | | yes | yes | 538 | 3 |

Blocking resistance is measured at 120° F. (48.9° C.) with the blocking face next to the back of the lidding material. Specimen 1 to 6 and 10-12 include up to 5 wt. % of a micronized straight chained hydrocarbon synthetic wax.

The following tests were used to evaluate the heat seal adhesive. The water based copolymer dispersion was applied as a film with a dry coating weight of 4.5 to 5.5 g/m$^2$ and dried at 20-25° C. (air temperature) on a foiled polyester film for 24 hours/days or in a forced air oven at 75° C. for 5 minutes. For the blocking resistance testing, the specimen was mounted face to face or face to back and the specified pressure was applied for the specified time at the specified temperature. For the Heat Seal test, the specimen comprise the above heat seal adhesive dried onto a foiled polyester film in contact with sheets of high impact polystyrene (HIPS) that are meant to simulate the sealing surface of HIPS based containers.

Heat Seal

Sencorp Heat Sealer model 12AS/1—heated upper bar
Conditions—325° F. (163° C.), 40 psi, 0.75 seconds
1 inch wide by 8 inches long specimens and comprised one film strip of adhesive coated aluminized polyester and one film strip of high impact polystyrene.

Seal Strength

ASTM F88—unsupported sample specimen testing
MTS/Instron tensile tester/crosshead speed 12 inches/min
Average of 4 test results
Report peel strength and if failure within adhesive was adhesive or cohesive Koehler Blocking Test Koehler Block Tester Model K530
Dried coated films tested
  face-to-face—2 specimens
  face-to-back—4 specimens
4 psi force on Koehler Spring
Report degree of blocking after 24 hrs. at 120° F. (49° C.) and 140° F. (60° C.), respectively Blocking Results 5—No cling—falls apart very easily
4—Very slight cling—can hear a very slight ticking noise but can't feel any resistance.
3—Slight cling—can hear ticking and feel a slight resistance pulling them apart.
2—Cling—fairly tight pull usually will see slight transfer
1—Strong cling—Very tight hard to pull apart usually quite a bit of transfer
0—Blocked—Can't pull the sample apart usually without tearing the substrate.

While certain representative embodiments and details have been shown for the purpose of illustrating the subject invention, it will be apparent to those skilled in this art that various changes and modifications can be made therein without departing from the scope of the subject invention.

What is claimed is:

1. A waterborne polymer composition comprising a least one acrylic emulsion copolymer(s) A in aqueous media and dispersion of ethylene-vinyl acetate copolymer B, wherein said copolymer(s) A comprising:
   (a1) about 10-50 wt. % of repeating units from styrene and/or $C_1$-$C_3$-alkyl substituted styrene,
   (a2) about 50-90 wt. % of repeating units from $C_1$-$C_{12}$ esters of (meth or eth) acrylic monomers,
   (a3) about 0.0-5 wt. % of repeating units from acid functional monomers repeating units,
   (a4) about 0-10% of acrylonitrile and/or methacrylonitrile repeating units,
   (a5) about 0-20 wt. % of repeating units from other co-polymerizable monomers other than a1-a4 based on the weight of acrylic emulsions copolymer(s) A, and further comprising,
   (a6) about 0.2-3 wt. % of N-methylol (meth)acrylamide repeating units; and
   wherein said dispersion of ethylene-vinyl acetate copolymer B comprises a dispersion of ethylene-vinyl acetate copolymer in a liquid media, said copolymer B comprising:
   (b1) about 50-95 wt. % ethylene repeating units,
   (b2) about 5-50 wt. % vinyl acetate repeating units, and
   (b3) about 0-5 wt. % repeating units from other co-monomers based on the weight of polymer B and
   said copolymer(s) A and copolymer B being present in weight ratios of 95:5 to 40:60.

2. A waterborne polymer composition according to claim 1, wherein said acrylic emulsion copolymer(s) comprises 0-3 wt. % of repeat units from crosslinking monomers comprising two or more ethylenically unsaturated groups per molecule.

3. A waterborne polymer composition according to claim 1, wherein said copolymer B further comprises 0.2-5 wt. % of carboxylic acid functional repeating units.

4. A waterborne polymer composition according to claim 1, wherein said copolymer B has less than 1 wt. %, based on the weight of the dispersion of said copolymer in a liquid media of surfactants of less than 500 g/mole molecular weight.

5. A waterborne polymer composition according to claim 1, wherein said copolymer B has a volume average particle size distribution of between diameters of 0.5 to 20 micrometers.

6. A waterborne polymer composition according to claim 1, wherein said copolymer B has a volume average particle size distribution of between diameters of 3 to 15 micrometers.

7. A waterborne polymer composition according to claim 1, further comprising a defoamer.

8. A waterborne polymer composition according to claim 1, further comprising dispersed micronized straight chained hydrocarbon synthetic wax.

9. A waterborne polymer composition according to claim 1, further comprising wetting agents and/or surfactants.

10. A waterborne polymer composition according to claim 1, formed into a film and said film used as a heat seal adhesive on lidding material comprising polyester, PVC, polystyrene, metalized foil or mixtures thereof.

11. A waterborne polymer composition formed into a film according to claim 10, wherein said copolymer B as a dispersion of ethylene-vinyl acetate copolymer in a liquid media exists as particles of ethylene-vinyl acetate copolymer and said particles after film formation of said acrylic copolymer are embedded in an acrylic copolymer film and wherein said ethylene-vinyl acetate particles extend above said acrylic copolymer film between 1 and 18 micrometers.

12. A waterborne polymer composition formed into a film according to claim 11 and used as a heat seal adhesive on lidding material and having resistance to blocking of 4 or 5 in the Koehler Blocking Test during storage at 37° C. for 24 hours at 4 psi pressure.

13. A waterborne polymer composition formed into a film according to claim 10, used as a heat seal adhesive on lidding material wherein said heat seal adhesive is characterized by forming an adherent bond between said lidding material and polystyrene film when a laminate of said lidding material, said heat seal adhesive, and said polystyrene film are treated at 200° C. at 87 psi (6 bar) for 0.5 seconds.

* * * * *